July 13, 1948. S. E. HILBLOM 2,445,267
DUMP RAKE
Filed Dec. 27, 1943 4 Sheets-Sheet 3
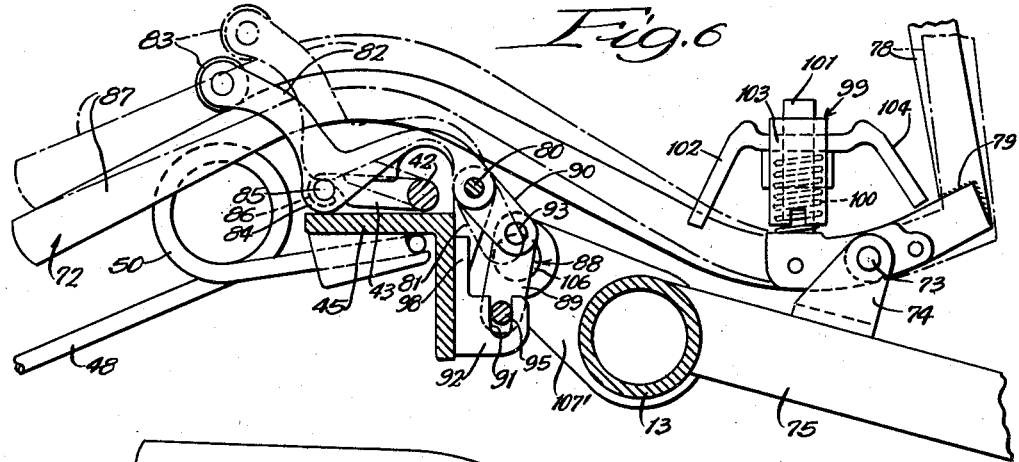
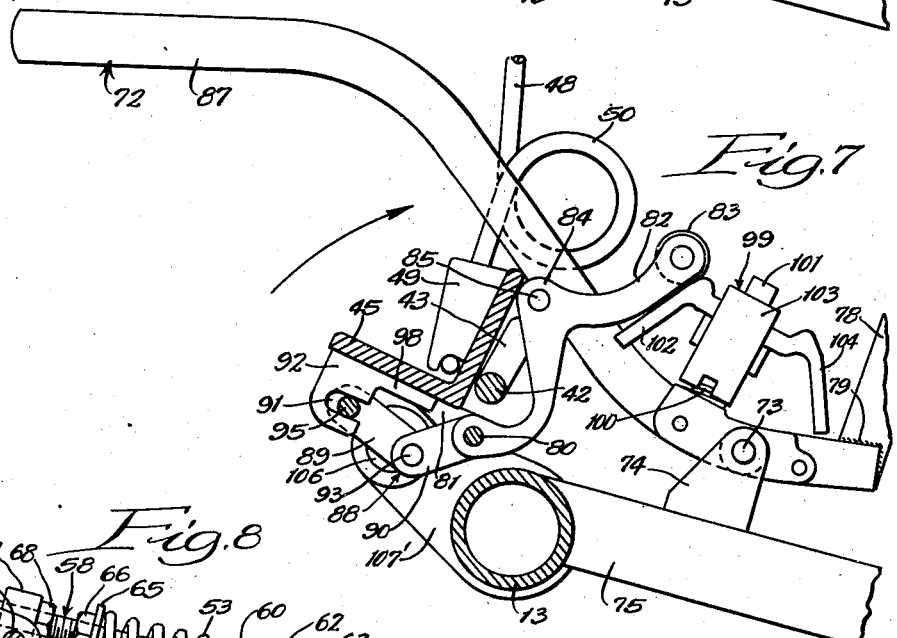
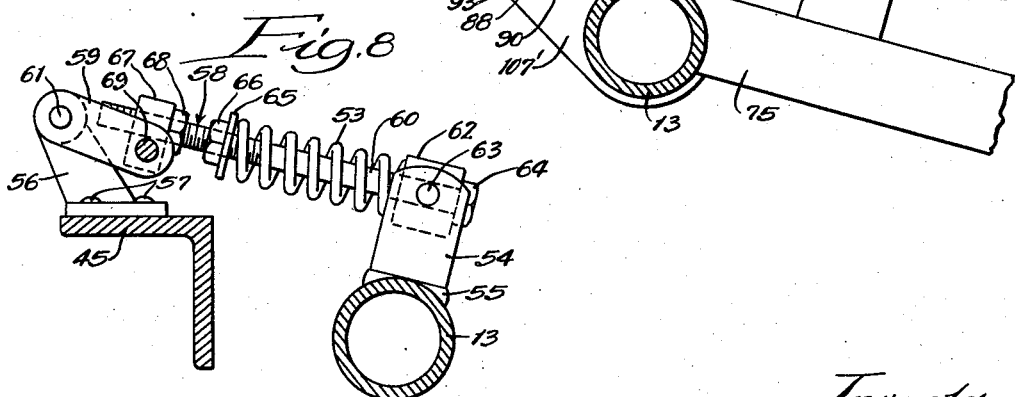
Inventor:
Samuel E. Hilblom,
By Paul O. Pippel
Attorney.

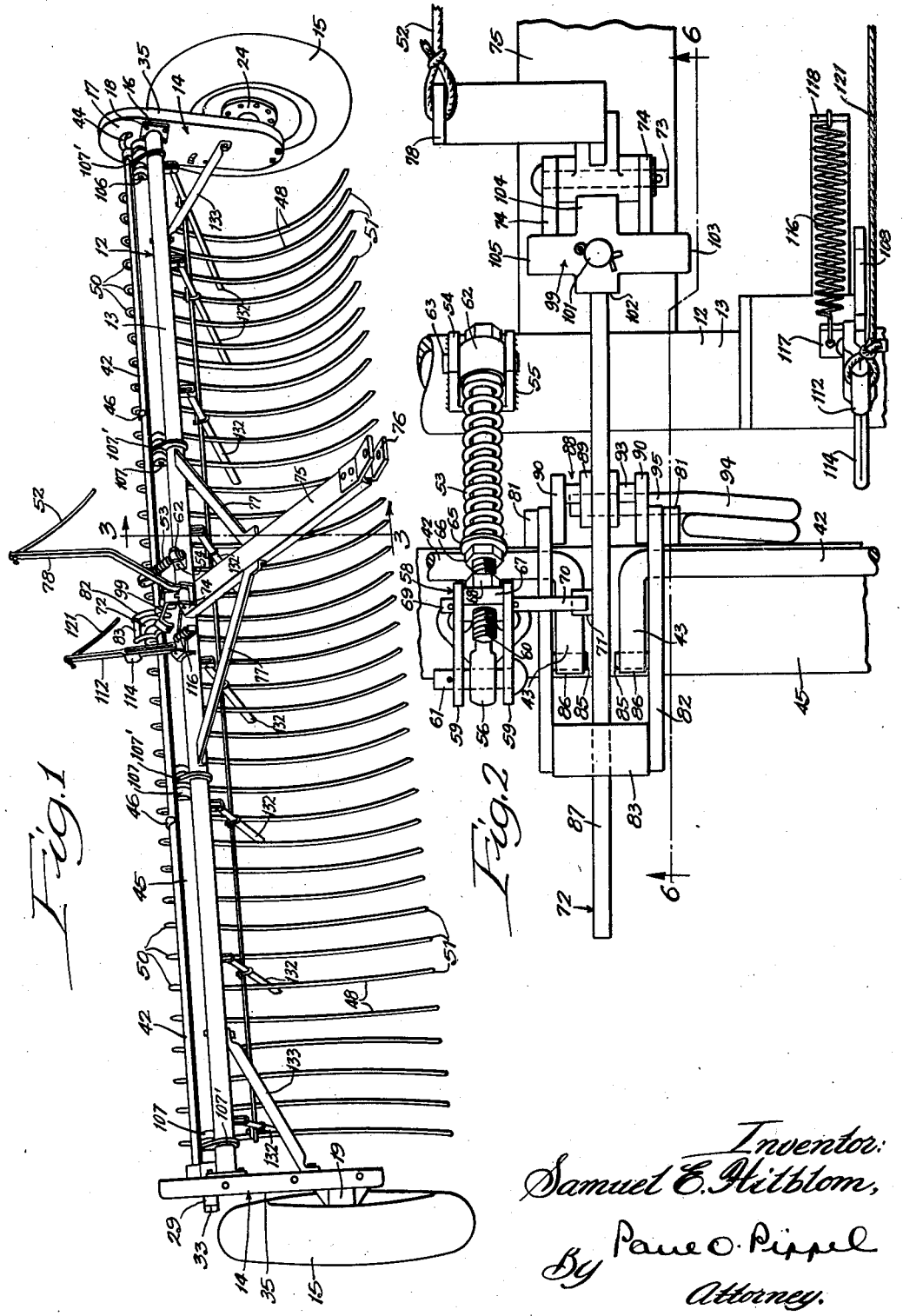

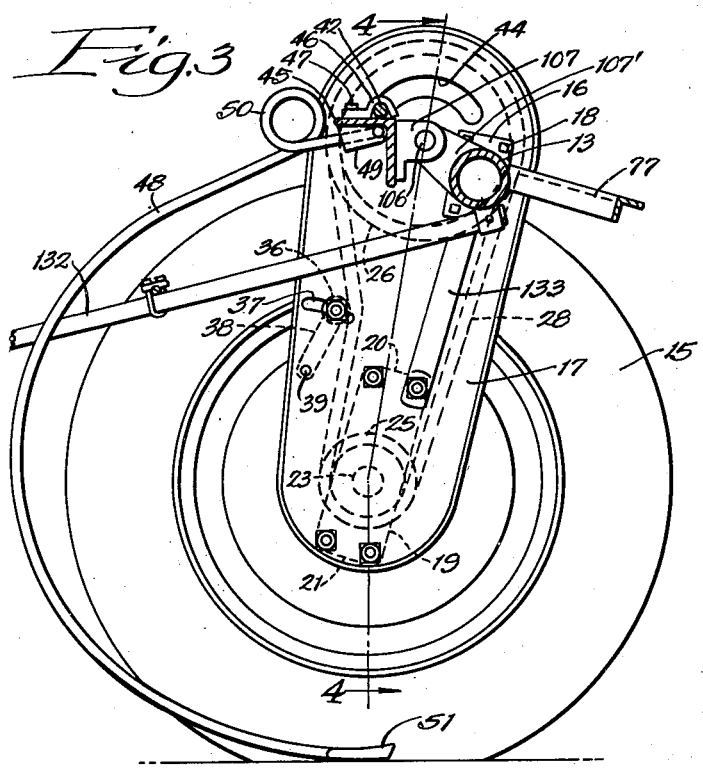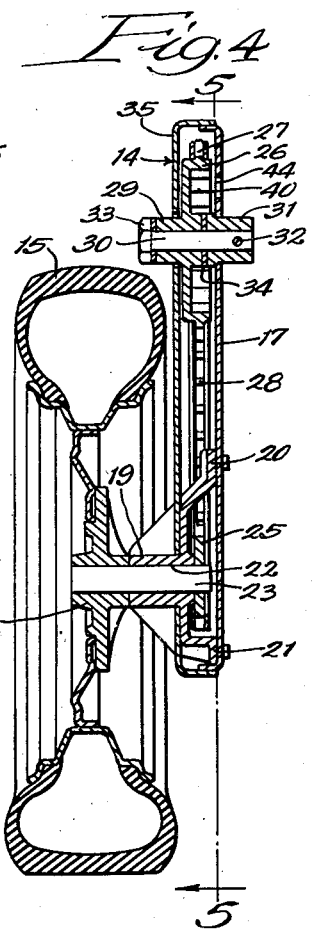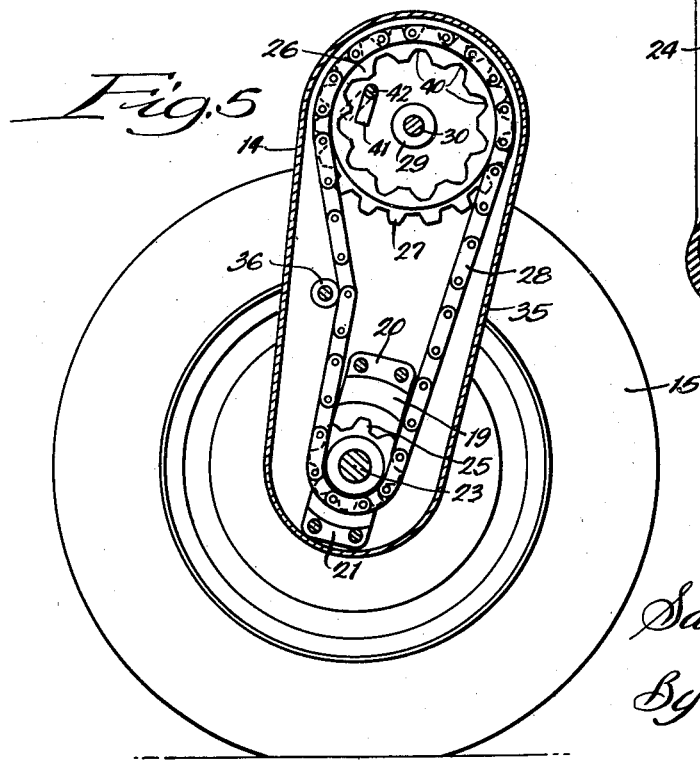

Inventor:
Samuel E. Hilblom,
By Paul O. Pippel
Attorney.

Patented July 13, 1948

2,445,267

UNITED STATES PATENT OFFICE 2,445,267

DUMP RAKE

Samuel E. Hilblom, Chicago, Ill., assignor to International Harvester Company, a corporation of New Jersey Application December 27, 1943, Serial No. 515,685

4 Claims. (Cl. 56—386)

This invention relates to a new and improved dump-type hay rake and has for one of its principal objects the provision of means for locking the rake in dumping position.

An important object of this invention is to provide a pull-type hay rake which is capable of having its dumping mechanism operated by a pull rope adjacent the driver of the vehicle.

Another and further important object of this invention is to provide a second pull rope positioned adjacent the driver of the draft vehicle and adapted to cause the rake to be locked in raised dumping position or released from this raised position upon successive pulling of this second pull rope.

Another and still further important object of this invention is the provision of a pull-type hay rake which does not require an operator to be seated thereon and yet is capable of as easy control as though an operator were present thereon.

A still further important object of this invention is to provide a low wheeled hay rake of the dump type having an arched frame and a drive carried upwardly from the wheels of the rake to the dump mechanism of the rake.

Heretofore, hay rakes of the dump type have been made and used with relatively large wheels so that the axle of the wheels could carry a full-size rake on the underside thereof. In the present invention, much smaller wheels are employed, which wheels will receive a standard size pneumatic tire. An arched frame is thereby associated with these small standard size wheels and tires to enable the use of a standard size hay rake. It has been customary to employ horses for pulling hay rakes, and it has been convenient for the driver to sit directly on top of the rake rather than have a wagon or other vehicle in front of the rake. However, with the greater use of farm tractors, an operator using such a tractor cannot drive the tractor as well as sit on the rake. Hence, the raking operation, which is relatively simple in itself, requires two persons.

It is an object of the present invention to eliminate the need for a separate rake operator and permit the operator of the draft tractor to have full and complete control of the rake by means of several pull ropes terminating adjacent the tractor driver's seat.

A particular object of the invention is to provide a low-wheeled arched frame hay rake, which may have its rake raised and positively locked in this raised position during transporting of the rake to and from the fields to be raked.

Other and further important objects of the present invention will become apparent from the disclosures in the following specification and accompanying drawings, in which:

Figure 1 is a perspective view of the low-wheeled dump-type hay rake of this invention;

Figure 2 is a plan view of the rake dumping and locking mechanism;

Figure 3 is a sectional view taken on the line 3—3 of Figure 1;

Figure 4 is a sectional view taken on the line 4—4 of Figure 3;

Figure 5 is a further sectional view taken on the line 5—5 of Figure 4;

Figure 6 is a detailed sectional view taken on the line 6—6 of Figure 2, showing the rake dumping mechanism;

Figure 7 is a sectional detail similar to that in Figure 6 with the rake in dumping position;

Figure 8 is a specific detail of the toggle and spring means for resiliently maintaining the rake in raking position;

Figure 9:
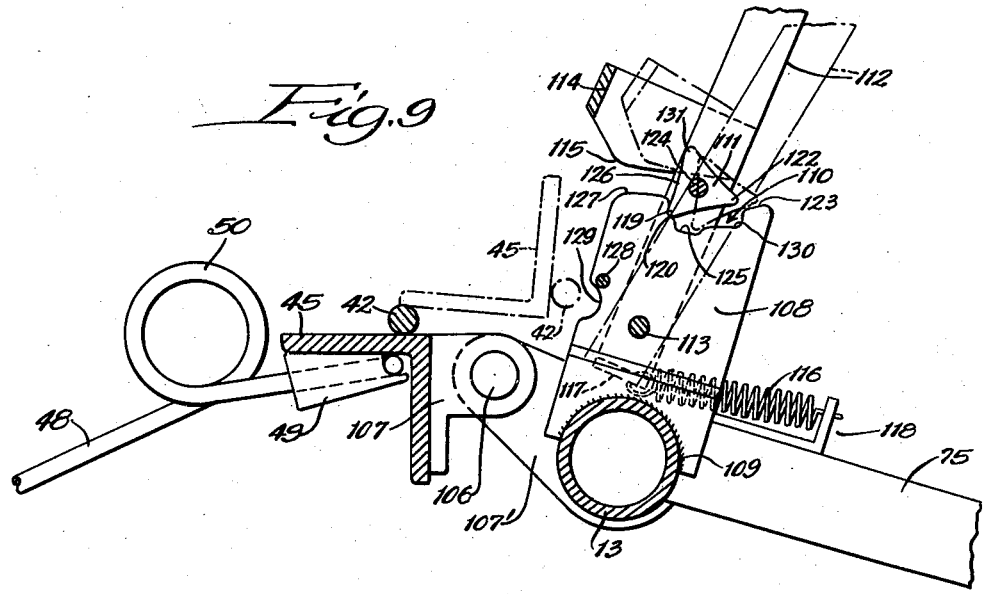
Figure 9 is a sectional view of the transport locking means.

As shown in the drawings, the reference numeral 12 indicates generally an arched frame consisting of a transverse beam or torque tube having depending drive housings 14 at each end thereof. At the lower ends of the drive housings 14 are mounted small standard size wheels 15 which are adapted to run on the ground and provide driving force for the rake dumping mechanism. The drive housings 14 are best shown in Figures 3, 4, and 5. In Figure 3, the torque tube 13, having end flanges 16, is bolted to the inner plate 17 of the depending housing 14 by means of bolts 18. It is, of course, obvious that the main supporting pipe 13 could be welded or otherwise fastened to this depending housing 14. The inner plate 17 of this housing 14 is a rigid member and is adapted to receive the entire load of the rake and transmit it through the wheels 15. A special bracket 19, substantially conical in shape, is bolted or otherwise fastened to the inner plate 17 at 20 and 21. This bracket 19 has a central aperture 22 which forms a bearing support for the short wheel axles 23. A hub 24 of the wheel 15 is keyed or otherwise attached to the axle 23. A considerable portion of this short axle 23 is journaled within the bearing 22 of the bracket 19. A sprocket 25 is affixed to the end of the axle shaft 23 opposite the wheel hub 24 and positioned within the depending drive housing 14. The upper ends of these housings 14 are adapted to journally support sprockets 26 which have outer sprocket teeth in alinement with the sprocket 25. As best shown in Figure 5, a chain 28 is adapted to be trained about sprockets 25 and 26.

The sprocket 26 has a hub portion 29 which is journaled on a pin 30. A sleeve 31 is welded or otherwise fastened to the plate 17 and has a central passage therethrough adapted to receive the end of the pin 30. A cotter pin, or the like 32, passes through the sleeve 31 and the pin 30 to maintain the pin 30 in fixed relationship with the sleeve 31. A head 33 is provided on the pin 30 to bear against the hub 29 of the sprocket 26, to thereby hold it centered within the housing 14. A washer 34 is positioned intermediate the sleeve 31 and the other side of the hub 29.

The housing 14, in addition to having an inner supporting plate 17, has an outer cover plate 35 which is not for the purpose of receiving any of the rake load but prevents dust and dirt from depositing on the driving members. It is obvious that when repairs are necessary, this outer plate 35 may be removed and access may be had to the interior of the housings 14.

The conical shaped bracket 19 has substantial portions of its periphery cut away so that it may be positioned between the sides of the chain 28 as thus shown in Figure 5. The tension on the chain 28 is maintained by a roller 36 which, as shown in Figure 3, is adjustable through an arcuate slot 37 in cooperation with the arm 38 pivoted at 39.

The sprocket 26 positioned in the upper end of the housing 14 is equipped with internal ratchet teeth 40. A pawl 41 is capable of swinging to a position shown in dotted lines in Figure 5 about its main shaft portion 42 and thus engage these ratchet teeth 40. As the wheel 15 moves over the ground, the sprocket 25 is simultaneously rotating and imparts rotation to the sprocket 26. It is obvious, therefore, that when the pawl 41 does engage the ratchet teeth 40, the pawl 41 and its rod portion 42 will be rotated with the sprocket 26. The pair of housings 14 are identical in construction, each containing a sprocket 26 and associated pawl 41. The rod portion 42 of these pawls 41 terminate centrally of the rake and have their ends turned rearwardly as shown at 43 in Figure 2. The rod portions 42 of the pawls 41 are adapted to be rotated through the arcuate slots 44 in the inner plates 17 of the housing 14. The rod portions 42 are affixed to the angled rake head support 45 by means of clamp members 46 which are bolted at 47 to the head and have arcuate portions which extend over the top of the rod 42. These clamp members 46 are positioned at several points along the length of the rake and are adapted to maintain the relationship of the rod 42 to the rake head 45, but yet permit rotation of the rods 42 without corresponding rotation of the head 45.

Rake tines 48, mounted beneath the upper flange of the rake head support 45, are secured thereto by means of brackets 49. The tines 48 are each equipped with a looped portion 50 which gives the tines a resilient construction and permits them to yield rearwardly when the lower ground-engaging ends 51 of the tines strike some obstruction. In the position shown in Figures 3, 6, 8, and 9, the rake tines 48 are shown in ground-engaging position.

The present hay rake is adapted to dump hay at the will of the operator. Such dumping is accomplished by means of a pull rope 52. As previously stated, hay rakes of the dumping type have been equipped with operators' seats directly on the rake frame and the dumping mechanism was operated by means of a foot pedal. It was customary for the operator to maintain his foot on his operating pedal and so hold the rake in ground-engaging position. In this way, when the rake did strike an obstacle which would cause damage to the rake tines 48, the operator would immediately receive an impulse through his foot on the pedal and would, of course, immediately release his foot and permit the rake tines to swing upwardly and rearwardly to avoid the obstacle.

In lieu of an operator whose foot is constantly maintaining the rake in raking position, a spring 53 is provided intermediate the torque tube 13 and the rake head 45 on this tractor pulled rake. A U-shaped bracket 54 is welded or otherwise fastened to the torque tube 13 at 55, as shown in Figures 2 and 8. Another bracket 56 is mounted on top of the rake head angle 45 and is fixedly attached by means of rivets or bolts or the like 57. The connection between the brackets 54 and 56 forms a toggle 58 which is best shown in Figure 8. Toggle link arms 59 and 60 are pivotally connected to the brackets 56 and 54, respectively. The toggle link arm 59, as shown in Figure 2, is composed of two parallel plate members which are mounted on each side of the upwardly extending bracket 56. The plates 59 and bracket 56 are pivotally joined by a hinge pin 61. The U-shaped bracket 54 has a sleeve member 62 pivoted therebetween by the hinge pin 63. The toggle link arm 60 is superposed by the spring 53 which is adapted to act against the periphery of the sleeve 62, while a portion of the arm 60 projects through the sleeve 62. An enlarged head portion 64, which is on the opposite side of the sleeve 62 to that of the spring 53, contacts the sleeve 62, thus limiting movement of the link arm 60 in a rearward direction. The other end of the spring 53 abuts a washer member 65 held rigidly in place on the link 60 by means of a nut 66. It is obvious, therefore, that the spring normally tends to separate the sleeve 62 and the washer 65. A depending bracket 67 is affixed to the end of the link arm 60 by means of the integral nut 68. The lower end of this bracket 67 has an aperture in alinement with apertures in the toggle link arms 59. These elements are hinged together by means of the hinge pin 69. As heretofore stated, the rake teeth or tines 48 are held by the rake head 45, and it will be understood that any pressure on the end of the rake teeth 51 will be transmitted through the rake head 45 and the toggle linkage 58 to the spring 53. The rake is thus resiliently yieldably mounted.

The toggle 58, as shown in Figure 8, is positioned for raking operation. The hinge pin 69 is beneath a line drawn between the hinge pins 61 and 63. Such positioning of the hinge pin 69 will prevent an upward and rearward swinging of the rake head 45 until such time as the toggle 58 is broken and the hinge pin 69 raised above this imaginary line drawn between the hinges 61 and 63.

As best shown in Figure 2, the hinge pin 69 has an elongated extension 70, which lies in the path of a nub 71 welded or otherwise fastened to the lever 72. The lever 72 is pivoted at 73 on a U-shaped bracket 74 which is welded or otherwise fastened to the rake tongue 75.

The end of the rake tongue 75 is equipped with a clevis 76 which may be hitched to a draw-bar of a tractor or other draft vehicle. Brace members 77 are positioned angularly between the tongue and the torque tube 13 to give the frame and hitch member more rigid support. An upwardly extending lever arm 78 is welded to the end of the lever 72 as shown at 79. The lever arm 78 is positioned slightly forwardly of the hinge pin 73. The upper end of the lever arm 78 has the pull rope 52 fastened thereto, and it is obvious that a forward pulling of the rope 52 will effect an upward movement of the rear end of the lever 72 or that portion of the lever 72 to the rear of the hinge pin 73.

The first requirement for dumping the rake is to release the toggle 58. Pulling of the rope 52 causes an upward movement of the rear portion 87 of the lever 72 and also the nub 71. The nub 71 strikes the extension 70 of the toggle hinge pin 69 and throws this hinge pin 69 of the toggle over center so that the toggle arms 59 and 60 may collapse upwardly. It is obvious now that the rake head 45 with its integral bracket 56 may swing upwardly and rearwardly about the hinge center 106 as shown in Figure 3.

The rake head angle support 45 has a bracket 81 fastened thereto, as shown in Figure 6. A hinge pin 80 is journaled in this bracket and carries on it the M-shaped arm 82 for limited pivotal movement. This M-shaped arm is in two parallel sections and supports a roller 83 between the ends thereof. The central depending portion of the M-shaped arm 82, denoted by the numeral 84, is adapted to normally rest on the top flange of the rake head 45, as shown in Figure 6, when the rake is in normal raking position. Pins 85 are welded to the inner sides of the two identical arms 84 so that they are in alinement with each other and yet are sufficiently separated, as shown in Figure 2, for the M members 82 to move with respect to arm 72. The pawl rods 42 have their ends 43 wrapped around these short pins 85, as shown at 86 in Figure 6, and it is obvious that when the M-shaped arm 82 is swung about its pivot 80, the ends 43 of the rods 42 will be lifted, and hence the rods 42 themselves will be rotated. As best shown in Figure 5, the location of the rod 42 causes an engagement of the pawl 41 with the ratchet teeth 40. It is quite evident that instead of wrapping the ends 86 around the pins 85, these bent portions 43 may be otherwise attached to the pin 85, such as by welding.

In operation, the rope 52 is pulled forwardly, thus tilting the end 87 of the lever 72 upwardly, as shown by the dashed lines in Figure 6. The end 87 of this lever 72 almost immediately contacts the roller 83 and begins lifting the arms 82 about their hinge pin 80, as shown in the dashed line position of the M-shaped arms 82. This movement, of course, raises the pins 85 and hence rotates the rods 42, whereupon the pawl 41 engages ratchet teeth 40. When the rake is being operated over a field, the ground wheel 15 is causing rotation of the sprocket 26. The pawl 41 will thereupon travel with the sprocket 26 through limited arcuate movement. Such movement is provided for in the innerplate 17 of the depending housing 14 by the slot 44. It is apparent that immediately upon engagement of the pawl with the ratchet teeth 40 the rake head 45 and its associated rake teeth 48 will necessarily rotate with the sprocket 26. Rotation of the rake head and its teeth causes a dumping of the rake load. However, immediately after dumping has been accomplished, it is desired to have the rake resume its raking position without further manual operation and also without damage to any of the driving parts.

In actuating the dumping mechanism, it would seem that it be necessary to maintain tension on the rope 52 so that the pawl 41 would remain in engagement with the ratchet teeth 40 sufficiently long to accomplish dumping. This is not the case, however, inasmuch as it would be difficult for an operator to hold the rope 52 for the proper period of time, and it is quite obvious that holding of the rope for too long a period would damage the pawl rods 42 at the termination of the slot 44. A toggle means is, therefore, provided at 88 which consists of toggle arms 89 and 90. The toggle arm 90 is pivoted on the hinge pin 80, and the toggle 89 is pivoted and vertically shiftable with the slot 91 in the bracket 92 affixed to the downwardly extending flange of the rake head 45. The toggle arms 89 and 90 are pivotally joined at their opposite ends by the hinge pin 93. A spring 94 shown in Figure 2 has one end fixed and its other end 95 forms the hinge pin for the toggle link 89. The spring 94 tends to resiliently maintain the toggle arms 89 and 90 in collapsed position. In the position of the rake dump elements, as shown in Figure 6, the toggle links 89 and 90 are collapsed in a forward direction. As long as these arms are in this position, the pawls 41 will not remain engaged with the ratchet teeth 40 without continued tension of the rope 52. Raising of the end 87 and the lever 72 causes a lifting of the M-shaped arm 82, as previously stated, and an extending of the toggle arms 89 and 90 so that the spring end or the pin 95 moves downwardly in the slot 91. Continued upward movement of the M-shaped member 82 will cause the hinge pin 93 to collapse in an opposite direction, that is, to the rear of a line drawn between the pins 80 and 95. The spring 94 will then tend to maintain the toggle arms 89 and 90 in their newly collapsed position. However, the bracket 92 having an upward extension 98 limits the collapsing movement of these toggle arms and maintains the M-shaped arms 82 in an upward position in relation to the rake head 45. In order to accomplish this result, the toggle arms 90 form an integral extension of the end member 82, and therefore, when the toggle arms 90 rotate about the hinge 80, the M member 82 will also rotate about the hinge 80. It is merely necessary now to provide pawl disengaging means, and inasmuch as the bent ends 43 of the rods 42 were rotated to accomplish engagement of the pawls, a disengagement may be effected by an opposite rotation of the bent ends 43.

Figure 7 of the drawings shows the rake in fully raised position wherein the rake teeth 48 will drop their entire load. A limit stop 99 is provided on the lever 72 at the point 100 just forwardly of the pivot pin 73. This limit stop, as best shown in Figure 2, may be rotated about its vertical axis 101 and present at its rear end a plurality of different length stops. As best shown in Figure 2, the shortest stop 102 is positioned at the rear, but it is obvious that the long stop 103 may be rotated to the rear position or either of the intermediate length stops 104 or 105, respectively. As shown in Figure 7, the roller 83 on the M-shaped arms 82 is adapted to contact one of the stops 102, 103, 104, or 105. When the limit member 99 is positioned as in Figure 2, the rake will raise its maximum distance, whereas when the stop 103 is put into the path of the roller 83, the rake will raise its minimum amount. When the roller 83 does strike the limit member stop 102 or any of the other stops, it immediately prevents further rotation of the M-shaped member 82 about its pivot 80. At this point, however, the rake head 45 does not cease movement but rather continues in its rotation about the center axis 106 as shown in Figure 3, until such time as the now halted M member 82 and its integral pin 85 cause a withdrawal of the pawl 41.

Brackets 107 are positioned at intervals along the length of the rake head 45 and are fixedly attached to the downwardly extending flanges thereof. These brackets 107 are adapted to support hinge pins on the axis 106 in cooperation with rearwardly extending brackets 107' on the torque tube 13. It is evident that the rake head 45 will be hingedly supported about the axis 106.

After pulling the rope 52, it may be immediately released, and the collapsing of the toggle 88 in a rearward direction will maintain the M-shaped member 82, and particularly its depending center 84, away from the rake head 45 and thus permit the pawl 41 to engage and travel with the ratchet teeth 40. The toggle 80 is limited in its rearward collapsing by the upward tension 98 of the bracket 92. Dumping of the rake now continues as shown in Figure 7. The roller 83 strikes the adjustable limit member 99 and causes withdrawing of the pawl 41 from the ratchet teeth 40, thereupon stopping the rake in its upward movement. There is now nothing to hold the rake in its upper position, and inasmuch as the rake head 45 is pivoted at 106, which is a considerable distance from the rake head 45, it will immediately fall by gravity about this axis 106 and resume its raking. Heretofore, the angled rake head was itself pivoted and not pivoted on a lever arm. Under such conditions the rake was slower in its resumption of raking position, for the reason that the load was not as great as it is now through the lever arm or bracket 107.

There are times in the use of a hay rake when it is desired to maintain the rake in a raised position such as when the rake is being transported from barn to field or from one field to another. A locking mechanism is provided in conjunction with this rake which will permit locking of the rake in raised transport position. It will be understood, of course, that in such raised position, the pawl 41 must be removed from the ratchet teeth 40.

Figure 10:
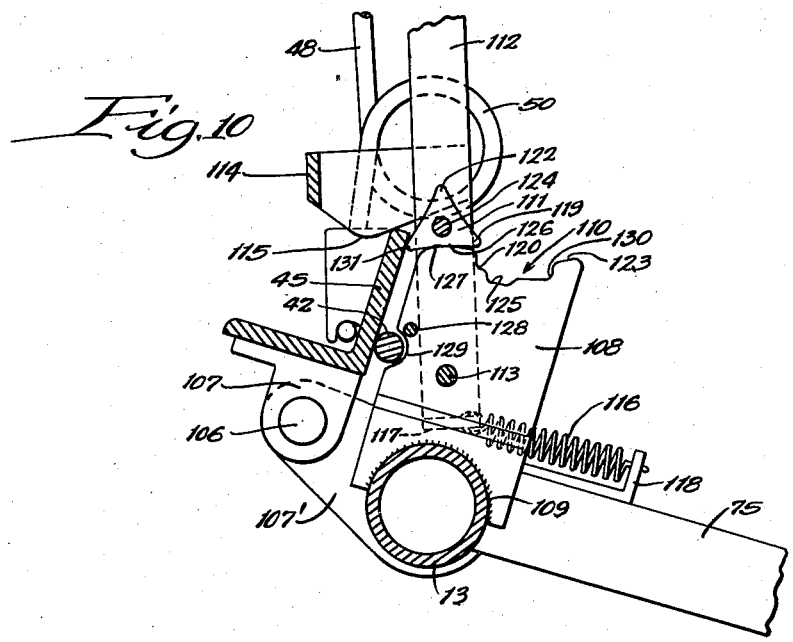
Figure 10 is a view similar to Figure 9 showing the rake in raised and locked position.

A plate 108 is preferably welded to the torque tube 13 as at 109, but may be otherwise attached as desired. The upper end of the plate 108 is provided with a cut-out portion 110 adapted to receive a triangularly shaped wheel 111 which is pivoted on the lever arm 112. The lever arm 112 is pivoted at 113 on a lower portion of the plate 108. In normal operation of the rake, the rake head 45 is relatively far apart from the plate 108 and its associated lever 112. A projection bail-like bracket 114 is welded or otherwise fastened to the arm 112 so that it projects rearwardly with respect to the forward portion of the rake. This bracket 114 has an apex 115 on its underside which is adapted to hold the rake head 45 when the rake is in its raised position as shown in Figure 10. In Figure 10, the apex 115 of the bracket 114 is positioned to the rear of the rake head 45 and will not permit the rake head 45 to resume its raking position until the apex 115 is removed from its locking position. A spring 116 is fastened to a downward extension of the arm 112 at 117 and at its other end is anchored to a bracket 118 affixed to the torque tube 13. This spring 116 tends to yieldably hold the arm 112 in a rearward position such as shown in Figure 10, and this position will be maintained except when the arm 112 is locked in a forward position. The arm 112 is normally locked in the forward position, as shown in Figure 9, under all ordinary rake operation. The triangular wheel 111 has one of its apices 119 lodged in a small radius corner 120 of the large cut-out 110. As best shown in Figure 1, a rope 121 is attached to the upper end of the lever arm 112 and is positioned parallel to the rope 52 and also extends forwardly to a position adjacent the operator of the tractor. A forward pulling of the rope 121 will cause a shifting of a lever arm 112 to a position as shown in the dashed lines in Figure 9, whereupon an apex 122 of the wheel 111 has ridden over a cam end portion 123 and thus has caused some rotation of the wheel about its pivot 124. A releasing of the rope 121 will cause the apex 119 to enter the large depression 125, contrary to its previous resting place of corner 120. In this position, the arm 112 is no longer restrained in its movement, and the spring 116 causes it to move forwardly, whereupon the triangular wheel will roll over so that its concave side 126 will ride on the smooth end portion 127 of the plate 108. In this position, the bracket 114 extends to the rear of the plate 108.

In operation, the rake may be locked in raised transport position merely by pulling the rope 52 and dumping the rake in the ordinary manner and then immediately pulling the rope 121 and causing the bracket 114 to project into the path of the rake-head 45. As the rake head 45 goes upwardly and forwardly, it strikes the apex 115 of the bracket 114 and moves it rearwardly to a point where the apex 115 is sufficiently high for the rake-head 45 to pass thereunder, whereupon the lever arm 112 will swing forwardly and lock the rake-head in this raised position. It will be understood that the pawl 41 will be removed from the ratchet teeth 40 after the apex 115 of the bracket 114 has passed rearwardly of the upper end of the rake head 45 and before the rake-head has struck any of the locking mechanism consisting of the plate 108 and the wheel 111.

A pin 128 is provided on the plate 108 and acts as a rearward limit stop for the arm 112. The rear edge of the plate 108 is provided with a cut-out 129 for the purpose of receiving or permitting maximum forward movement of the pawl rods 42. To release the rake from its raised position, it is merely necessary to again pull the rope 121 forwardly, whereupon the apex 119 will this time lodge in the arcuate recess 130. The apex 131 will come to rest in the small radius recess 120 upon a releasing of the rope 121 thus permitting the spring 116 to pull the arm 112 about its pivot 113. It is quite evident that the lever arm 112 will then be relocked in a similar position to that shown in Figure 9. In such position the rake will be released and will resume its ordinary raking and dumping without interference from the transport lock.

The subject hay rake is quite advantageous for the reason that it may be dumped and also locked in raised position merely upon successive forward pulling of the ropes 52 and/or 121.

Rake stripping bars 132 are provided at regular intervals along the length of the torque tube 13 and are adapted to strip the rake teeth of hay when the rake is lifted. Brace members 133 are positioned angularly between the depending housings 14 and the torque tube 13 and thereby reinforce the frame 12.

The intention is to limit the invention only within the scope of the appended claims.

What is claimed is:

1. In a dump type hay rake, a generally transversely extending fixed frame, wheels journaled on and supporting the ends of said fixed frame, a tongue attached to and extending forwardly from said fixed frame, a substantially vertically disposed plate attached to and forming a part of said fixed frame and extending upwardly therefrom, said plate having a notched upper surface, a rake head having raking tines, said rake head and raking tines hingedly mounted on the rear of the fixed frame for movement between a ground engaging position and an up crop dumping position, lock means for holding said rake head in an upwardly hinged position, said lock means comprising a lever arm pivotally attached intermediate its ends to said fixed frame and disposed substantially vertically and adjacent said vertically disposed plate, a tension coil spring attached at one end to the lower extension of said lever arm and at its other end to said fixed frame to urge the upper extension of said lever arm rearwardly, a bracket attached to the upper extension of said lever arm and extending rearwardly therefrom, said bracket having a downwardly and rearwardly inclined lower edge adapted to overlie and hold said rake head in its upwardly hinged position, a detent mounted on said lever arm, means for pulling the upper extension of said lever arm forwardly against the action of the tension spring, and said detent arranged and constructed to engage the notched upper surface of said plate to hold the lever arm and its bracket out of rake head engaging position.

2. In a device as set forth in claim 1 in which means is provided in the notched upper surface of said plate to effect release of the detent and a return of the upper extension of the lever arm to a rearwardly inclined rake locking position by action of the spring means upon a successive pulling of the upper extension of the lever arm.

3. In a device as set forth in claim 1 in which the detent comprises a generally triangular shaped wheel rotatably mounted on said lever arm and the means for pulling the upper extension of the lever arm forwardly comprises a rope.

4. In a device as set forth in claim 3 in which the notched upper surface of the plate includes a rearwardly disposed corner for holding one of the apices of the triangular shaped detent wheel, said notched upper surface of the plate including a large central depression and a cammed ledge at the forward end thereof whereby a successive pulling of said rope causes said triangular detent to have another of its apices rotated by the cammed ledge and a releasing of said rope permits the coil spring to swing the upper end of said lever arm rearwardly whereby the first of said triangular apices enters said large central depression causing said detent to rotate and ride over the rearwardly disposed corner whereupon locking of the rake head in its up position is again permitted.

SAMUEL E. HILBLOM.

REFERENCES CITED

The following references are of record in the file of this patent:

UNITED STATES PATENTS

| Number | Name | Date |
|---|---|---|
| 703,624 | Thompson | July 1, 1902 |
| 983,642 | Pelton | Feb. 7, 1911 |
| 992,384 | Pearson | May 16, 1911 |
| 1,164,133 | Smith | Dec. 14, 1915 |
| 1,278,181 | McIntire | Sept. 10, 1918 |
| 1,401,274 | Mottier | Dec. 27, 1921 |
| 2,352,589 | Scarlett et al. | June 27, 1944 |